United States Patent Office 3,493,007
Patented Feb. 3, 1970

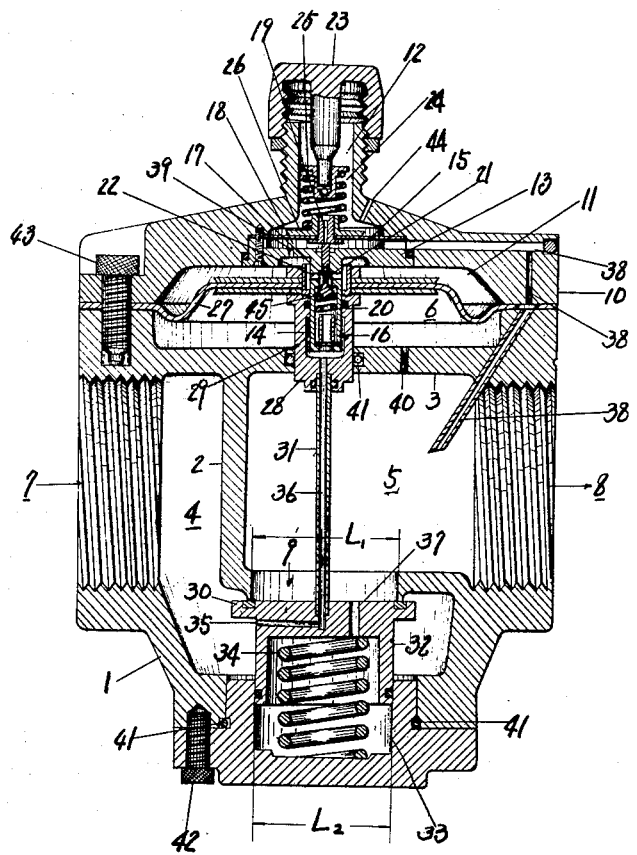

3,493,007
REDUCING VALVE
Tomomitsu Iizumi, Tokyo-to, Japan, assignor to Shoketsu Kinzoku Kogyo Kabushiki, Kaisha, Tokyo-to, Japan
Filed May 31, 1967, Ser. No. 642,570
Claims priority, application Japan, Nov. 25, 1966, 41/108,115
Int. Cl. B05d 16/16; F16k 17/32, 31/365
U.S. Cl. 137—116.5
5 Claims

ABSTRACT OF THE DISCLOSURE

A pressure regulator valve in which a drop in the set outlet pressure acting against a spring biased pilot valve diaphragm allows the pilot valve diaphragm to open a pilot valve to admit inlet pressure to a main valve actuating diaphragm top chamber to open the main valve. When the outlet pressure reaches the set value, then the outlet pressure raises the pilot valve diaphragm sufficiently to allow the spring biased pilot valve to close and a restricted venting of the top chamber allows a spring bias to close the main valve. Overpressure in the outlet zone opens a vent to atmosphere. Special provisions are made for balancing the main valve with respect to both inlet and outer pressures, and to simplify the valve and diaphragm assemblies and their relations to the casing.

---

This invention relates to a pilot type pressure reducing valve for handling a large quantity of flow wherein a pressure supply port alone, which has to do with flow characteristics, can be made large irrespective of a pressure regulating mechanism and a cylinder-like rod containing therein a pilot valve mechanism and without aggravating pressure characteristics.

The structure of the present invention will be described with reference to the accompanying drawing showing a pilot type pressure reducing valve according to the invention.

A main valve housing 1 is divided by a partition wall 2 and top partiton wall 3 into a primary chamber 4, a secondary chamber 5 and a main valve switching diaphragm bottom chamber 6. The primary chamber communicates with a high pressure side 7 leading to a pressure supply source while the secondary chamber 5 communicates with a pressure regulating side 8 receiving a supply of pressure. A pressure supply port 9 is provided in the partition wall for establishing communication between the primary and secondary chambers. An upper body 10 rigidly mounted on the main valve housing has at its lower surface a recess constituting a main valve switching diaphragm top chamber 11 and at its upper central portion a chamber 12 for a pressure regulating mechanism. A partition wall body 13 has at its central lower portion a shell 14 containing therein a pilot valve mechanism, said partition wall body being screwed into the chamber 12 whereby a pressure regulating diaphragm 15 is tightly installed in the chamber 12. The pilot valve mechanism to be installed in the shell 14 of this partition wall body is constructed in the manner as follows. The rod 17 of the pilot valve 45 is inserted from below into the lower cylindrical portion 16 of the shell 14 and passed from the partition wall body 13 into the pressure regulating diaphragm bottom chamber 18 so that the tip end of the pilot valve rod 17 is opposed to the central vent hole 19 of the pressure regulating diaphragm 15. The pilot valve is permanently and resiliently urged upward by a spring 20 inserted in the lower cylindrical portion 16. A rod insertion hole 21 in the shell is open to the main valve switching diaphragm top chamber 11 through a branch hole 22. A cap 23 is screwed on the upper body and also serves for adjustment of the resilience of a pressure regulating spring 25 in the chamber 12, i.e., in the pressure regulating diaphragm top chamber 24. A member indicated at 26 is a pressure spring holder. A main valve switching diaphragm 27 is tightly interposed between the main valve housing and the upper body and a cylinder-like rod 28 is rigidly secured to the central portion of said main valve switching diaphragm. The cylinder-like rod 28 has a cylinder 29 in which the shell 14 integral with the partition wall body 13 can be fitted. A bar 31 is rigidly secured to and suspended from the lower end of said cylinder 29, and a main valve 30 for closing the pressure supply port 9 from the primary chamber is rigidly secured to said bar 31. The lower cylindrical portion 32 of the main valve 30 is tightly fitted in a valve guide 33 and is permanently and resiliently urged upward by a spring 34 in the valve guide. Communication between the primary chamber 4 and the cylinder 29 is established by means of communicating holes 35 and 36. Further, a communicating hole 37 is provided in the main valve 30 for establishing communication between the secondary chamber 5 and the valve guide 33. A series of communicating holes 38 are provided for establishing communication between the secondary chamber 5 and the pressure regulating diaphragm bottom chamber 18. A communicating hole 39 establishes communication between the pressure regulating diaphragm bottom chamber 18 and the main valve switching diaphragm top chamber 11. Finally, a communicating hole 40 is provided for establishing communication between the main valve switching diaphragm top chamber 6 and the secondary chamber 5. The reference numeral 41 designates an O-ring. Fastener means 43 serves to clamp the main valve housing and the upper body together. A vent hole 44 is provided for establishing communication between the pressure regulating diaphragm top chamber and the atmosphere.

In the above-mentioned arrangement, the essence of the present invention is as follows.

The area of the pressure supply port 9 is made larger than that of the lower cylindrical portion 32 of the main valve 30 and the effective area of the interior of the cylinder 29 of the cylinder-like rod 28 is made equal to the difference between said two areas, while the pressure within the primary chamber 4 is caused to act inside the cylinder 29 and the pressure within the secondary chamber 5 is caused to act inside the lower cylindrical portion 32, whereby the pressures within the primary and secondary chambers acting on the main valve 30 cancel each other.

This will be explained in more detail. At the time of closing of the main valve, the force tending to push up the main valve is equal the sum of a force F determined by the secondary pressure and the area of the lower cylindrical portion of the main valve and a force F determined by the primary pressure and the difference in area between the pressure supply port 9 and the lower cylindrical portion 32. On the other hand, the force tending to push down the main valve is equal to the sum of a force F determined by the secondary pressure and an area on the main valve surface equal to the area of the lower cylindrical portion and a force F determined by the primary pressure and the effective area within the cylinder 29. However, since the difference in area between the pressure supply port and the lower cylindrical portion of the main valve is equal to the effective area of the cylinder, as described above, the primary pressure on the main valve is vertically cancelled and the secondary pressure on the main valve is also vertically cancelled. Thus it follows that at the time of closing of the main valve, the main valve is pressed against the pressure supply port only by the action of the spring 34. The drawing shows instance in which a set pressure exists on the pressure regulating side 5 and a balanced condition exists between a pressure regulating spring and the pressure in the secondary chamber. And the pilot valve 45 has just closed the rod insertion hole 21 and the tip end of the rod 17 closes the central vent hole 19 of the pressure regulating diaphragm. Further, the secondary pressures prevailing in the main valve switching diaphragm top and bottom chambers 11 and 16 cancel each other as they equally act therein. Moreover, the primary and secondary chamber pressures acting above and below the main valve are mutually cancelled for the above-mentioned reason. Thus it follows that the main valve 30 is urged from below against the pressure supply port 9 only by the action of the main valve spring 34. In this condition, if the pressure on the pressure regulating side is decreased, the pressure within the pressure regulating diaphragm bottom chamber is necessarily decreased in accord therewith. As a result, the pressure regulating diaphragm 15 is pushed down by the pressure regulating spring. When the pressure regulating diaphragm is pushed down, the rod of the pilot valve is similarly urged downward to cause the pilot valve to leave the rod insertion hole so that the existence of the branch hole 22 establishes communication between the primary chamber and the main valve switching diaphragm top chamber, thereby upsetting the balance between the main valve switching diaphragm top and bottom chambers. As a result, the main valve switching diaphragm 7 is moved downward. Further, since the main valve is provided on the lower end of the cylinder-like rod rigidly secured to the main valve diaphragm and the main valve spring, which urges the main valve upward, is of low resilience as mentioned above, the main valve can be easily moved downward by the unbalance in pressure between the main valve switching diaphragm top and bottom chambers. Thus, the main valve opens the pressure supply port and the pressure within the primary chamber is since then forced into the secondary chamber. When the pressure within the secondary chamber rises for the above-mentioned reason, the pressure within the pressure regulating diaphragm bottom chamber also rises to push up said pressure regulating diaphragm against the force of the pressure regulating spring. Concurrently with upward movement of the pressure regulating diaphragm, the pilot valve is moved upward. When the pressure regulating diaphragm is moved upward, the said pilot valve closes the rod insertion hole so that the communication between the primary chamber and the main valve switching diaphragm top chamber is cut off. As a result, the main valve switching diaphragm top chamber can communicate with the secondary chamber only through the vent hole 39, pressure regulating diaphragm bottom chamber 18 and vent holes 8. In addition, since the main valve switching diaphragm bottom chamber 6 is in constant communication with the secondary chamber, the pressures in the main valve switching diaphragm top and bottom chambers are equal to each other and the action of the main valve spring urges the main valve against the pressure supply port.

With the above-mentioned actions thus effected, it follows that the pressure in the secondary chamber resumes the set pressure. In case that the pressure in the secondary chamber is higher than the set pressure after the closing of the main valve, the pressure regulating diaphragm is slightly pushed upward from the position shown in solid lines against the force of the pressure regulating spring so that a slight clearance will be produced between the tip end of the rod of the pilot valve and the pressure regulating diaphragm. As a result, the pressure in the secondary chamber escapes through the central vent hole of the diaphragm into the pressure regulating diaphragm top chamber and therefrom it is discharged into the atmosphere through the vent hole 44 of the upper body. That is, the pressure at the secondary side is gradually reduced. And by the fact that the tip end of the rod is pressed against the central small hole of the pilot valve, the pressure in the secondary chamber is stabilized. That is, it attains the set pressure. In addition, the change of the set pressure in the secondary chamber, i.e. at the pressure regulating side can be freely effected from the outside by operating the cap to change the pressure on the pressure regulating diaphragm exerted by the pressure regulating spring. It is thus seen from the above that according to the present invention, the area of the pressure supply port is made greater than the area of the lower cylindrical portion of the main valve and the effective area of the interior of the cylinder of the cylinder-like rod is made equal to the difference between said areas while the pressure in the primary chamber is caused to act in the cylinder and the pressure in the secondary chamber is caused to act in the lower cylindrical portion of the main valve, whereby the pressures in the primary and secondary chambers acting on the main valve are mutually cancelled. As a result of this arrangement, by making a design so that the difference in area between the pressure supply port and the lower cylindrical portion of the main valve is equal to the effective area of the interior of the cylinder-like rod, it is possible to infinitely increase the pressure support port alone, which has to do with flow characteristics, without aggravating the pressure characteristics while leaving the pilot valve mechanism and the pressure regulating mechanism as they are.

What is claimed is:

1. A pilot type pressure reducing valve of the sort which comprises a casing having a primary chamber and a secondary chamber with a partition therebetween, a main valve in said partition, a main valve shifting mechanism for moving said main valve, a pressure regulating mechanism for effecting a pressure regulating action by detecting the pressure in the secondary chamber and a pilot valve mechanism opened and closed by said pressure regulating mechanism for actuating the main valve shifting mechanism, particularly characterized in that the main valve shifting mechanism comprises a main valve diaphragm connected to said main valve and separating top and bottom chambers in said casing, means for subjecting said bottom chamber to the pressure in the secondary chamber, and means for subjecting said top chamber selectively to the pressure in the secondary chamber or the pressure in the primary chamber, said last named means comprising a cylinder rigidly secured to the main valve shifting diaphragm and projecting into said secondary chamber, a bar connecting said cylinder and said main valve, and means establishing communication between the interior of said cylinder and the interior of the primary chamber for admitting primary chamber pressure to the interior of said cylinder.

2. A pressure reducing valve as claimed in claim 1, said last named means comprising a passage extending from said primary chamber through said main valve and through said bar to the interior of said cylinder.

3. A pressure reducing valve as claimed in claim 2, wherein the main valve has an external unbalanced area exposed to the pressure in the primary chamber and facing away from the valve opening so that the pressure in the primary chamber acting thereagainst tends to urge said main valve toward closed position, and wherein said cylinder has an internal unbalanced area facing toward the valve opening substantially equal in area to said external unbalanced area, whereby the valve, rod and cylinder assembly is balanced with respect to the pressure in the primary chamber.

4. A pressure reducing valve as claimed in claim 1, wherein the main valve is provided with a piston smaller in area than its valve closing face, and wherein the casing comprises a piston chamber in which said piston is reciprocable, said valve comprising means for establishing communication between said piston chamber and said secondary chamber, and wherein said top chamber wall has an extension projecting into said cylinder so that said main valve shifting mechanism has an area exposed to the pressure in said bottom chamber greater than the area thereof exposed to the pressure in said top chamber by an amount determined by the area of said extension, said greater area being substantially equal to the difference in areas between said piston and said valve closing face of said main valve.

5. A pressure reducing valve as claimed in claim 1, wherein the casing comprises a pilot valve housing projecting into said cylinder and slidably sealing the same, said pilot valve being mounted in said pilot valve housing for controlling admission of primary chamber pressure from said cylinder into said top chamber, said pressure regulating mechanism comprising an adjustably spring biased pressure regulating diaphragm positioned above said pilot valve for opening said pilot valve when flexed theretoward by said adjustable bias, on a reduction in the secondary chamber pressure below that set by the spring bias adjustment of said pressure regulating diaphragm, for opening said pilot valve to effect movement of said main valve toward opened position; said pressure regulating mechanism comprising vent means (19) for establishing communication from said top chamber to atmosphere when the pressure in said secondary chamber ceeds that set by the spring bias adjustment of said pr sure regulating diaphragm.

References Cited

UNITED STATES PATENTS

| | | | |
|---|---|---|---|
| 2,593,557 | 4/1952 | Hamilton | 137—489 |
| 2,806,481 | 9/1957 | Faust | 137—116 |
| 3,071,146 | 1/1963 | Friedell et al. | 137—489.5 X |
| 3,086,548 | 4/1963 | Galiger et al. | 137—116.5 X |
| 3,139,899 | 7/1964 | Schwerter | 137—489 |
| 3,221,762 | 12/1965 | Chinn | 137—116 |
| 3,265,303 | 8/1966 | Harris | 137—491 X |
| 3,173,649 | 3/1965 | Bryant | 137—508.18 X |
| 3,402,566 | 9/1968 | Leinbach | 137—505.18 X |

M. CARY NELSON, Primary Examiner

ROBERT J. MILLER, Assistant Examiner

U.S. Cl. X.R.

137—489.5